US008856389B1

(12) United States Patent
Li et al.

(10) Patent No.: US 8,856,389 B1
(45) Date of Patent: Oct. 7, 2014

(54) EFFICIENT DATA TRANSFERS OVER SERIAL DATA STREAMS

(75) Inventors: Qing Yun Li, San Diego, CA (US); Biao Jia, Lake Elsinore, CA (US)

(73) Assignee: SMSC Holdings S.A.R.L., Luxembourg (LU)

( * ) Notice: Subject to any disclaimer, the term of this patent is extended or adjusted under 35 U.S.C. 154(b) by 125 days.

(21) Appl. No.: 12/874,070

(22) Filed: Sep. 1, 2010

(51) Int. Cl.
G06F 3/00 (2006.01)
G06F 13/00 (2006.01)
G06F 13/12 (2006.01)

(52) U.S. Cl.
USPC .................. 710/5; 710/32; 710/35; 710/71

(58) Field of Classification Search
CPC ....... G06F 13/00; G06F 13/42; G06F 13/124; G06F 13/4282
USPC ........................................... 710/5, 32, 35, 71
See application file for complete search history.

(56) References Cited

U.S. PATENT DOCUMENTS

| 6,829,663 | B1* | 12/2004 | Ghaffari et al. ........... 710/71 |
| 6,925,519 | B2 | 8/2005 | Day et al. |
| 7,643,410 | B2* | 1/2010 | Chang et al. ............. 370/229 |
| 7,747,788 | B2* | 6/2010 | Chang et al. ............. 710/5 |
| 7,805,543 | B2* | 9/2010 | Chang et al. ............. 710/6 |
| 2007/0226447 | A1* | 9/2007 | Shimozono et al. ....... 711/170 |
| 2007/0260756 | A1* | 11/2007 | Tseng et al. ............. 710/5 |
| 2009/0144453 | A1* | 6/2009 | Lin et al. ............. 710/3 |
| 2009/0265505 | A1* | 10/2009 | Yang et al. ............. 711/103 |
| 2010/0011149 | A1* | 1/2010 | Molaro et al. ............. 711/103 |

OTHER PUBLICATIONS

Native Command Queuing, http://en.wikipedia.org/wiki/NCQ, Aug. 12, 2009, 2 pages.
Direct memory access, http://en.wikipedia.org/wiki/Direct_memory_access, Mar. 11, 2010, 6 pages.
Intel, Serial ATA II Native Command Queuing Overview, Application Note, Apr. 2003, 21 pages.

* cited by examiner

Primary Examiner — Idriss N Alrobaye
Assistant Examiner — Getente A Yimer
(74) Attorney, Agent, or Firm — King & Spalding L.L.P.

(57) ABSTRACT

Various techniques are provided to support efficient data transfers over serial data streams. In one example, a serial device may be used to efficiently transfer data between a host device and the serial device over a data stream of a serial interface. A data stream value identifying the data stream may be stored in a register indexed by a tag associated with a command received from the host device. The command may be passed to a storage media device, wherein the passing is controlled by a processor of the serial device. The tag may be extracted from an address value received from the storage media device in response to execution of the command by the storage media device. The data stream value may be retrieved from the register using the extracted tag as an index without requiring an interrupt to the processor to determine the data stream value.

24 Claims, 3 Drawing Sheets

EFFICIENT DATA TRANSFERS OVER SERIAL DATA STREAMS

BACKGROUND

1. Technical Field

Embodiments of the disclosure generally relate to data transfers and more particularly to efficient streaming of data between devices.

2. Related Art

Native Command Queuing (NCQ) is a technology designed to increase performance of a hard drive by allowing the hard drive to internally optimize or "queue" the order in which received commands (e.g., read or write commands) are executed. Multiple commands may be received at a serial device from a host device, for example, over various data streams of a Universal Serial Bus (USB) interface (e.g., a USB 3.0 interface). The serial device may pass the commands to the hard drive which may execute the commands in a different order than sent by the host device in accordance with NCQ techniques.

Data provided in response to the execution of one of the commands by the hard drive is typically transferred between the host device and the serial device over the same data stream as the command. However, the serial device typically will not know which command will be executed next until notified by the storage media device. Typically, the serial device must assert an interrupt to a processor of the serial device to determine the data stream associated with the command before data can be transferred in response to the command. Once determined, the processor typically must program a device controller with the proper data stream so that data can be transferred to the host device over the data stream expected by the host device. This additional processing introduces overhead and latency to data transfers between the serial device and the host device which reduces the overall data rate of such data transfers.

SUMMARY

Various techniques are provided to support efficient data transfers over serial data streams. In accordance with an embodiment, a method performed by a serial device includes receiving a command from a host device over a data stream of a serial interface; storing a data stream value to identify the data stream in a register indexed by a tag associated with the command; passing the command to a storage media device, wherein the passing is controlled by a processor of the serial device; receiving an address value from the storage media device in response to execution of the command by the storage media device; extracting the tag from the address value received from the storage media device; retrieving the data stream value from the register using the extracted tag as an index without requiring an interrupt to the processor to determine the data stream value; and passing data between the serial device and the host device over the data stream identified by the data stream value.

In accordance with another embodiment, a serial device includes a serial interface adapted to receive a plurality of commands over a plurality of data streams from a host device; a plurality of registers indexed by a plurality of tags and adapted to store a plurality of data stream values to identify the data streams; a processor adapted to control passing of the commands through the serial device to a storage media device; and a device controller adapted to: store one of the data stream values in one of the registers in response to one of the commands, wherein the data stream value identifies one of the data streams over which the one of the commands was received by the serial device, wherein the one of the registers is indexed by one of the tags, wherein the one of the tags is associated with the one of the commands, extract the one of the tags from an address value received from the storage media device in response to execution of the one of the commands by the storage media device, retrieve the data stream value from the register using the extracted tag as an index without requiring an interrupt to the processor to determine the data stream value, and pass data between the serial device and the host device over the data stream identified by the data stream value.

The scope of the invention is defined by the claims, which are incorporated into this section by reference. A more complete understanding of embodiments of the disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE FIGURES

Embodiments of the disclosure and their advantages are best understood by referring to the detailed description that follows. It should be appreciated that like reference numerals are used to identify like elements illustrated in one or more of the figures.

DETAILED DESCRIPTION

Various techniques are provided to support efficient data transfers over serial data streams. In one embodiment, a plurality of commands may be received at a serial device from a host device over a plurality of data streams. Each command may be associated with a corresponding tag and a data stream value (e.g., also referred to as a stream ID). The data stream value may identify the particular data stream over which the command was sent from the host device. The data stream values may be stored in a plurality of registers indexed by the tags (e.g., also referred to as NCQ tags, command tags, or command indexes).

Upon execution of each command, the serial device may retrieve the data stream value associated with each command from one of the registers by using the tag associated with the command as an index. As a result, a data transfer may be efficiently performed with reduced latency over the data stream corresponding to the data stream value without requiring an interrupt to a processor of the serial device to determine the data stream value.

Such techniques are primarily described herein with regard to USB 3.0 devices in accordance with the USB 3.0 standard (e.g., which as used herein is intended to include the USB 3.0 standard and all similar versions (e.g., USB 3.x)). However, other devices (e.g., devices in accordance with other USB standards or other standards) may also be used in various embodiments. Other embodiments are also contemplated as discussed herein.

Figure 1:
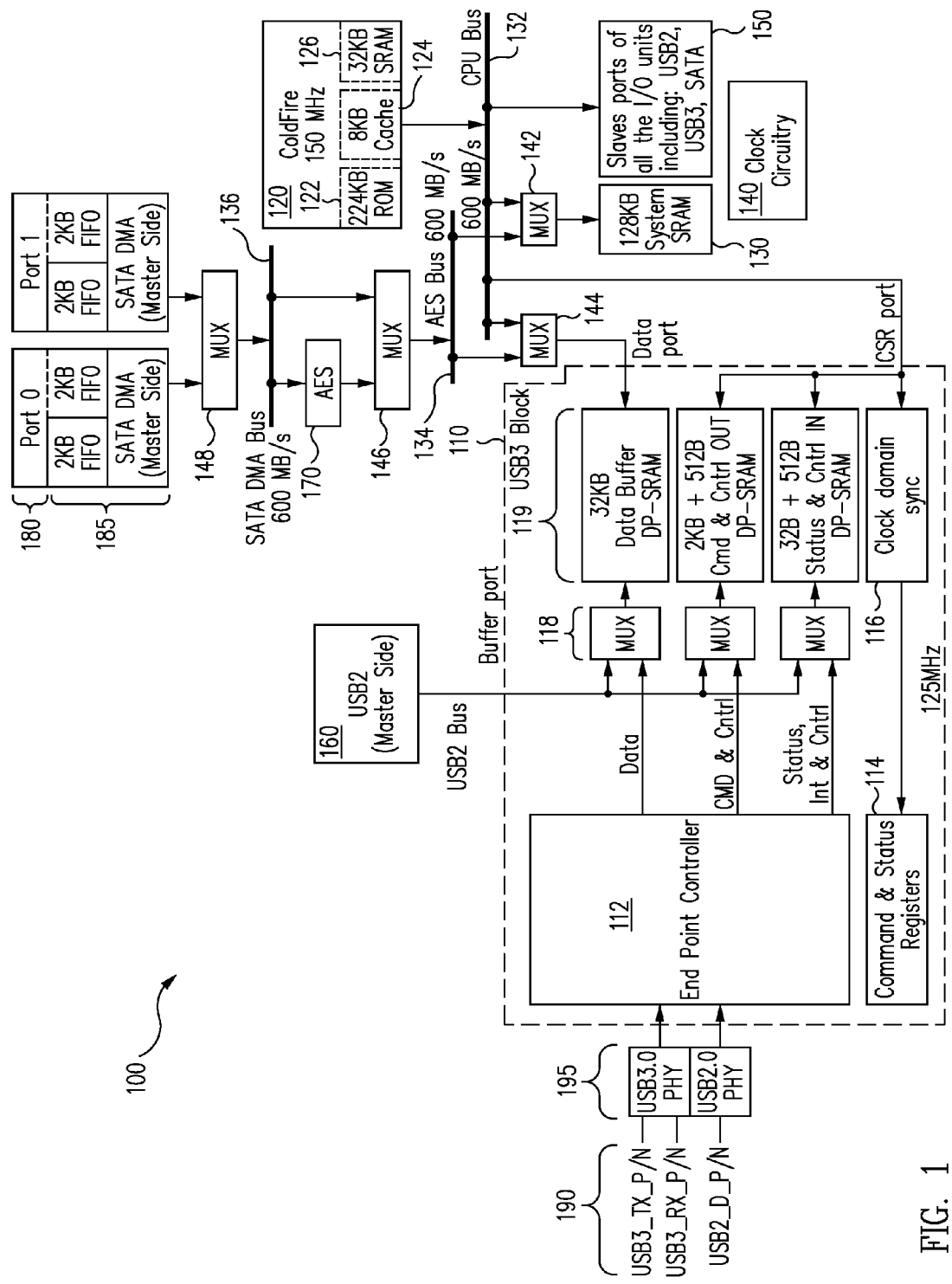
FIG. 1 illustrates a block diagram of a system which may be used to interface with a variety of different devices over various ports in accordance with an embodiment of the disclosure.

FIG. 1 illustrates a block diagram of a system 100 which may be used to interface with a variety of different devices over various ports. In one embodiment, system 100 may be implemented as a system on a chip that manages communications between a host device and one or more other devices. For example, system 100 may be used to provide bridging, hosting, and/or hub operations in accordance with various communication protocols.

System 100 includes a device controller 110, a processor 120, system memory 130, clock circuitry 140, slave ports 150, a configuration port 160, an encryption block 170, communication ports 180, physical layer components 185, communication ports 190, and physical layer components 195.

As shown in FIG. 1, system 100 includes various busses 132, 134, and 136, and multiplexers 142, 144, 146, and 148 to facilitate communications between device controller 110, processor 120, system memory 130, slave ports 150, encryption block 170, physical layer components 185, and physical layer components 195.

Device controller 110 may be configured to manage communications to and from physical layer components 195 associated with communication ports 190. For example, device controller 110 may be used to host one or more devices connected to communication ports 190. In one embodiment, device controller 110 may be implemented as a universal serial bus (USB) controller configured to permit system 100 to operate as a USB host to one or more USB slave devices connected to communication ports 190. As shown in FIG. 1, device controller 110 includes an end point controller 112, command and status registers 114, a clock domain synchronization block 116, multiplexers 118, and various memory blocks and buffers 119.

Processor 120 may be implemented, for example, as a Coldfire processor operating at 150 MHz with various associated memories and caches 122, 124, and 126. Processor 120 may be used, for example, to perform various bridging, hosting, and/or hub operations for communications exchanged between communication ports 180 and 190 as well as slave ports 150.

System memory 130 may be used by processor 120 and/or other components of system 100 to support the various operations of system 100. Clock circuitry 140 may be used to provide one or more clock signals to system 100. Slave ports 150 may be used to interface system 100 with various types of slave devices as may be desired in various implementations. Configuration port 160 may be implemented, for example, as a USB 2.0 port used to configure system 100 for desired operations. Encryption block 170 may be implemented, for example, to perform Advanced Encryption Standard (AES) encryption on data passed between communication ports 180 and the rest of system 100.

Communication ports 180 may be implemented, for example, as storage media device ports configured to support communications with storage media devices such as hard drives, flash drives (e.g., thumb drives, solid state drives, or others), optical storage media (e.g., CD-ROM, DVD, HD-DVD, Blu-Ray, or others), or other appropriate storage media devices. Such storage media device ports may be implemented in accordance with Serial Advanced Technology Attachment (SATA) interfaces, external SATA (eSATA) interfaces, Parallel Advanced Technology Attachment (PATA) interfaces, flash memory interfaces, or others. In the embodiment shown in FIG. 1, communication ports 180 are implemented as SATA interfaces. Physical layer components 185 may be used to facilitate communications between communication ports 180 and the rest of system 100.

Communication ports 190 may be implemented, for example, in accordance with various communication standards such as, for example, USB 3.0, USB 2.0, Firewire (e.g., IEEE 1394), or others. In the embodiment shown in FIG. 1, communication ports 190 are implemented as USB 2.0 and USB 3.0 ports. Physical layer components 195 may be used to facilitate communications between communication ports 190 and the rest of system 100.

In one embodiment, an external host device may be connected to one of communication ports 190. In this embodiment, system 100 may be configured to host one or more devices connected to communication ports 180 and/or 190 on behalf of the host device. In this regard, system 100 may facilitate communications between the host device and/or the various hosted devices.

In one or more embodiments, physical layer components 185 using ports 180 may provide appropriate interfaces or ports for components and related circuitry to support native command queuing operations further described herein.

Figure 2:
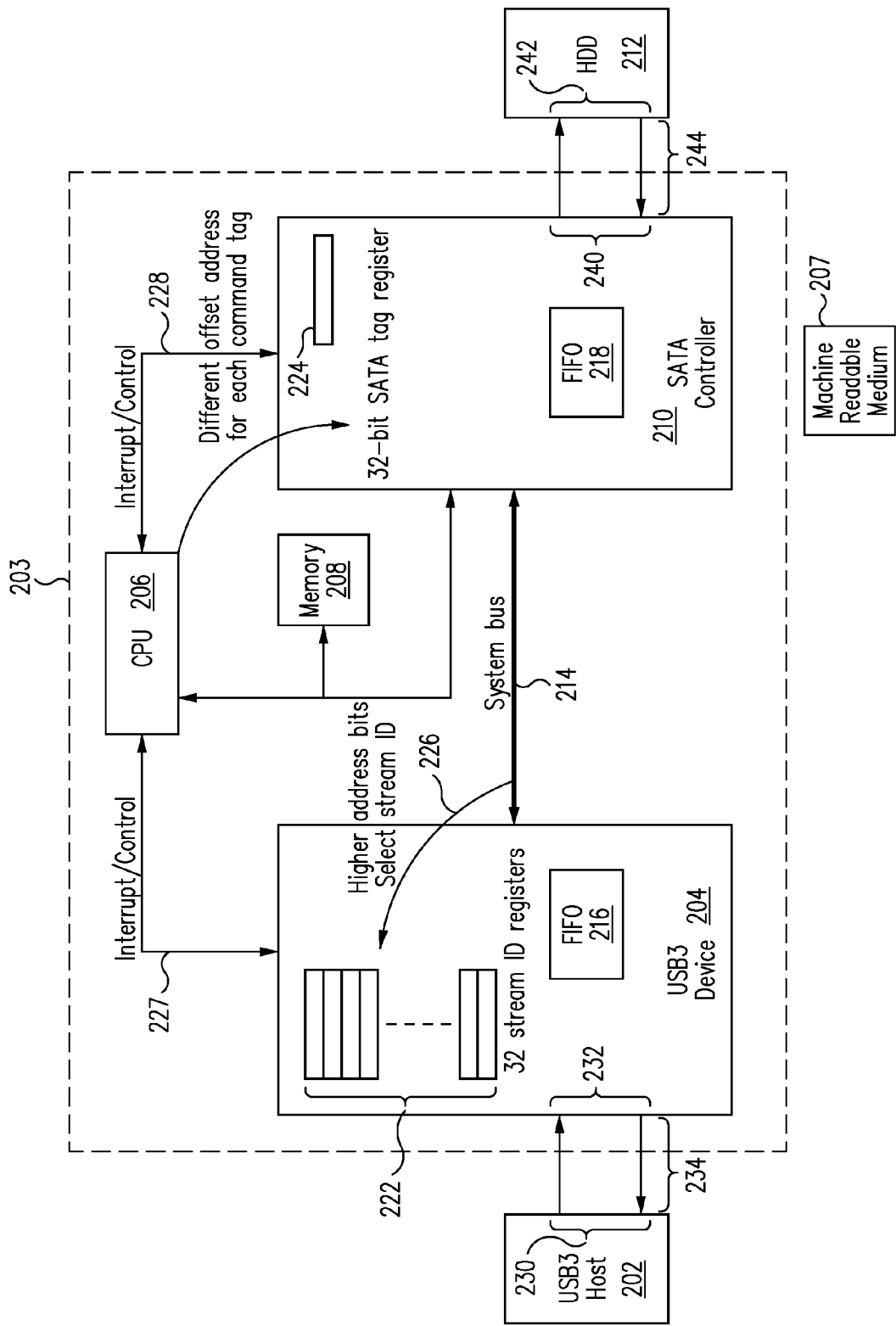
FIG. 2 illustrates a block diagram of a system including a host device, a serial device, and a storage media device in accordance with an embodiment of the disclosure.

FIG. 2 illustrates a block diagram of a host device 202, a serial device 203, and a storage media device 212 in accordance with an embodiment of the disclosure. Host device 202 may be implemented, for example, by a programmable computer system, dedicated hardware, or other configurations. Host device 202 may be configured with an interface (e.g., provided by ports 230) to connect to an interface (e.g., provided by ports 232) of serial device 203 over a bus 234. In one embodiment, ports 230/232 and bus 234 may be implemented in accordance with USB 3.0 interface standards. In other embodiments, these components may be implemented in accordance with other interfaces such as, for example, USB 2.0, Firewire (e.g., IEEE 1394), or others.

Serial device 203 may be implemented, in one embodiment, by system 100 of FIG. 1. In one embodiment, serial device 203 may be a storage media device enclosure that also includes storage media device 212. In another embodiment, storage media device 212 may be implemented separately from serial device 203 as shown in FIG. 2. Serial device 203 may be implemented as other types of devices in other embodiments.

Serial device 203 includes a device controller 204, a processor 206, a memory 208, and a storage media controller 210. Device controller 204 may be configured to manage communications to and from host device 202 through ports 232. Device controller 204 may be implemented with appropriate hardware and/or software to perform the various operations described herein. For example, in various embodiments, device controller 204 may include one or more processors, logic, memory, machine readable instructions (e.g., software, firmware, or other instructions stored in a memory or a machine readable medium 207), and/or other components as may be desired in particular implementations.

As shown in FIG. 2, device controller 204 includes a First In First Out (FIFO) buffer 216 (e.g., a memory) and registers 222. FIFO buffer 216 may be used to buffer data transferred through serial device 203. For example, in one embodiment, FIFO buffer 216 may be used to support streaming in accordance with the USB 3.0 standard. In this regard, FIFO buffer 216 may be used provide data bursts (e.g., up to 16 data bursts in one embodiment) without requiring the receipt of an acknowledgement message.

Registers 222 may be used to store data stream values. In this regard, each command received from host device 202 over the serial interface provided by ports 232 may be associated with a particular data stream. Multiple data streams may be provided over the serial interface through appropriate serial communication techniques. For example, in one embodiment, the serial interface may be a USB 3.0 interface capable of supporting data streams in accordance with the USB 3.0 standard.

Device controller 204 may associate each command received from host device 202 with a corresponding tag. For example, in one embodiment, up to 32 NCQ tags may be associated with 32 different USB 3.0 commands. Other numbers and types of tags and/or commands may be used in other embodiments. Registers 222 may be indexed by the tags and may store data stream values that identify the particular data streams over which associated commands were received from host device 202. Accordingly, the data stream associated with a particular command may be read from one of registers 222 by device controller 204 using the command's associated tag as an index without requiring an interrupt to processor 206. This configuration can reduce the overhead and latency associated with data transfers performed in response to the execution of such commands by storage media device 212.

Processor 206 may be configured with appropriate software (e.g., a computer program for execution by processor 206) that is stored on machine readable medium 207 (e.g., a CD-ROM or other appropriate medium) and/or in memory 208 to instruct processor 206 to perform one or more of the operations described herein. As shown in FIG. 2, interrupt and control signals 227 and 228 may be provided between processor 206 and device controller 204 and storage media controller 210 to control the passing of commands through serial device 203 to storage media device 212.

In one embodiment, processor 206 may create an address value for each command received from host device 202. After determining an address value for a command, processor 206 may pass the address value with the command to storage media controller 210 (e.g., through signals 228). In this regard, it will be appreciated that different commands may be sent to storage media device 212 with different address values. This contrasts with certain conventional approaches to SATA command handling which typically use the same destination address value for all commands sent to storage media devices.

In one embodiment, the address value may be a direct memory access (DMA) start address value associated with the command (e.g., a memory address value of host device 202, memory 208, FIFO buffer 216, FIFO buffer 218, or storage media device 212). The address value may further identify a tag (e.g., an NCQ tag) associated with the command. For example, five bits of the address value (e.g., bit 16 to bit 20 in one embodiment) may be used to identify the tag.

In one embodiment, the address value may be offset from a baseline address value based on the tag associated with the command. In such an embodiment, each address value may be offset from a baseline address value (e.g., a DMA start address value) by a multiple of the tag. For example, a command associated with a tag of 0 may have an address value used as a baseline address value (e.g., corresponding to an address value of 0x0 or any other desired baseline address value). A command associated with a tag of 1 may have an address value that is offset from the baseline address value by an offset value multiplied by 1 (e.g., the address value may be: baseline+(1*offset). Similarly, a command associated with a tag of 2 may have an address value that is offset from the baseline address value by an offset value multiplied by 2 (e.g., the address value may be: baseline+(2*offset). Additional address values may be determined for additional commands associated with other tags as desired. For example, in one embodiment, a maximum of 32 tags may be used to determine 32 corresponding address values. Other numbers of tags and/or address values may be provided in other embodiments.

In one embodiment, the offset values used to provide the address values may be a maximum data transfer size supported by the commands (e.g., the maximum size of data that may be read or written in response to a command). In this regard, the address values associated with the tags may be distributed over a plurality of address values which are separated from each other by the maximum data transfer size. In other embodiments, other offset values may be used.

In one embodiment, a set of bits (e.g., the upper address value bits and/or other bits) of the address value may identify the tag, such that the tag (e.g., the tag number or value) may be extracted directly from the address value without requiring an interrupt to be provided to processor 206. For example, upon execution of the command by storage media device 212, the address value may be passed back from storage media device 212 to serial device 203 as part of a setup notification sent by storage media device 212 (e.g., as part of a direct memory access (DMA) setup frame information structure (FIS) sent by storage media device 212 and/or with other data transferred from storage media device 212 in response to execution of the command). Device controller 204 may extract the tag and use the extracted tag as an index to registers 222. As a result, device controller 204 may read the data stream value associated with the executed command from the indexed one of registers 222 and thus permit a data transfer to be performed over the identified data stream without requiring an interrupt to be provided to processor 206.

In various embodiments, the address value may be created in accordance with the principles set forth in the following examples. In one example, multiple USB commands may be received from host device 202. In this regard, five bits (e.g., bits 16 through 20) of each command may be used to identify a tag which is included with a SCSI command contained in the USB command. Address values for the commands may be created by processor 206 based on the tag and an address value of FIFO buffer 216. For example, several commands and corresponding address values are listed in the following Table 1:

TABLE 1

| USB Command Number | Command Structure | Address Value |
|---|---|---|
| 0 | tag 0 + SCSI command 0 | FIFO address + 0x00000000 |
| 1 | tag 1 + SCSI command 1 | FIFO address + 0x00010000 |
| ... | ... | ... |
| 31 | tag 31 + SCSI command 31 | FIFO address + 0x00100000 |

In another example, a USB command may be received from host device 202. Device controller 204 may identify an unused NCQ tag number 5 (e.g., selected from the group of tag numbers 0 through 31) that may be used for the USB command. Device controller 204 may write the data stream value into the sixth one of registers 222 (e.g., one of registers 222 having index number 5 out of the set of index numbers 0 through 31). Processor 206 may create an address value (e.g., a data destination starting address) for the command (e.g., used when the command is converted into SATA format) equal to index 5+an address value of FIFO buffer 216: 0x00050000+FIFO address value. Upon receiving the address value back during execution of the command (e.g., with data moved into FIFO buffer 216 using the address value upon execution of the command), device controller 204 may extract tag 0x0005000 from the address value and use the extracted tag to retrieve the data stream value from the sixth one of registers 222.

Serial device 203 may be configured with an interface (e.g., provided by ports 240) to connect to an interface (e.g., provided by ports 242) of storage media device 212 over a bus 244. In one embodiment, host device ports 240/242 and bus 244 are implemented in accordance with Serial Advanced Technology Attachment (SATA) interfaces. In other embodiments, these components may be implemented in accordance with other interfaces such as, for example, external SATA (eSATA) interfaces, Parallel Advanced Technology Attachment (DATA) interfaces, flash memory interfaces, or others.

Storage media controller 210 may be configured to manage communications to and from storage media device 212 through ports 240. Storage media controller 210 may be implemented with appropriate hardware and/or software to perform the various operations described herein. For example, in various embodiments, storage media controller 210 may include one or more processors, logic, memory, machine readable instructions (e.g., software, firmware, or other instructions stored in a memory or machine readable medium 207), and/or other components as may be desired in particular implementations.

As shown in FIG. 2, storage media controller 210 includes a FIFO buffer 218 (e.g., a memory) and a register 224. FIFO buffer 218 may be used to buffer data transferred through serial device 203. Register 224 may be used to identify which commands have not yet been executed by storage media device 212 (e.g., a 32 bit register may be used with each bit associated with a corresponding tag in one embodiment).

Device controller 204 and storage media controller 210 are connected by a system bus 214 which may be used to pass data and address values between device controller 204 and storage media controller 210.

Storage media device 212 may be, for example, one or more hard drives, flash drives (e.g., thumb drives, solid state drives, or others), optical storage media (e.g., CD-ROM, DVD, HD-DVD, Blu-Ray, or others), or any other appropriate storage media devices. Storage media device 212 may execute commands received from serial device 203 through ports 240 and 242. For example, in various embodiments, such commands may be data read commands, data write commands, small computer system interface (SCSI) commands, SATA commands, and/or other types of commands. As discussed, serial device 203 may also pass an address value for each command to storage media device 212. Upon execution of a command, storage media device 212 may provide the address value created by processor 206 back to serial device 203 as described.

Storage media device 212 may be implemented with appropriate hardware and/or software to perform the various operations described herein. For example, in various embodiments, device controller 204 may include one or more processors, logic, memory, machine readable instructions (e.g., software, firmware, or other instructions stored in a memory or machine readable medium 207), and/or other components as may be desired in particular implementations.

Figure 3:
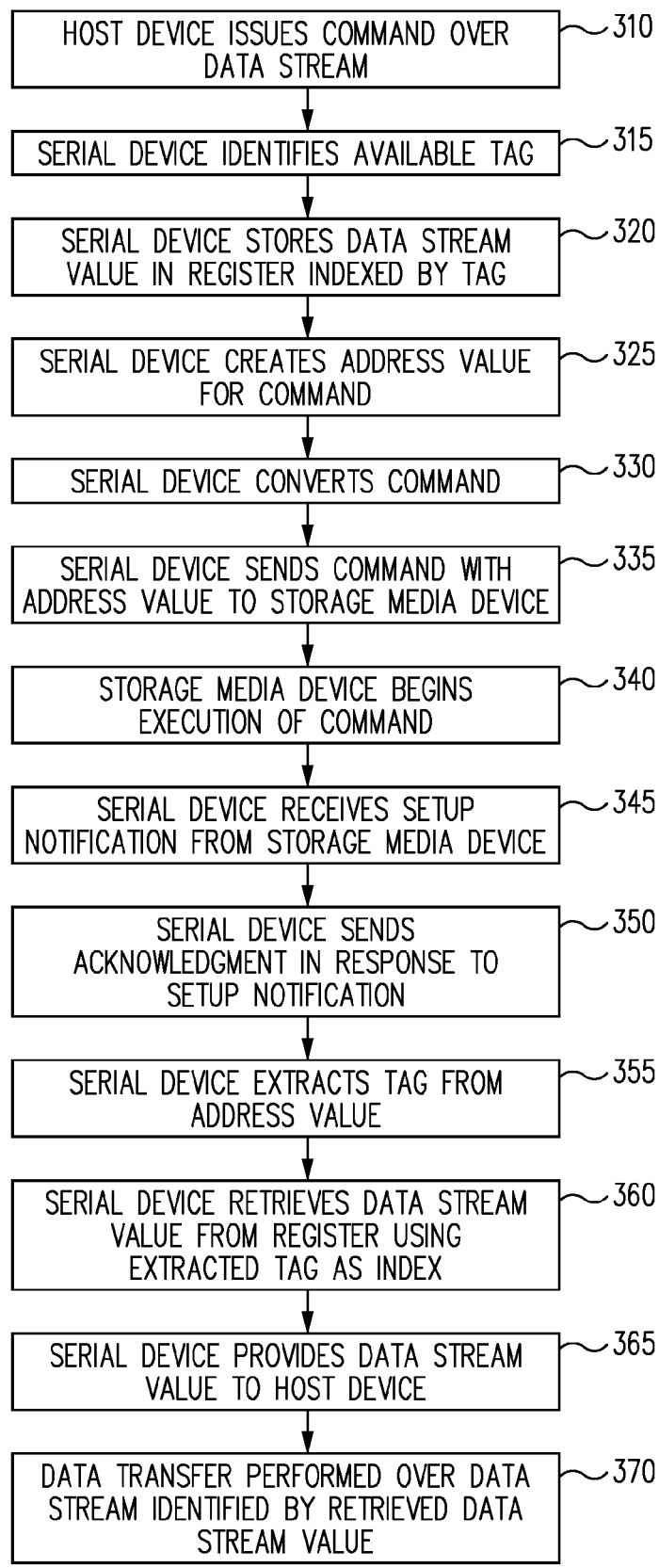
FIG. 3 is a flow chart illustrating a process of providing data transfers over a serial interface in accordance with an embodiment of the disclosure.

FIG. 3 is a flow chart illustrating a process of providing data transfers over a serial interface in accordance with an embodiment of the disclosure. In one embodiment, the process of FIG. 3 may be performed using host device 202, serial device 203, and storage media device 212 of FIG. 2.

In block 310, host device 202 issues a command to serial device 203 over one of the data streams, for example, of a USB 3.0 interface. In one embodiment, the command may be a USB command including a SCSI command.

In block 315, device controller 204 of serial device 203 identifies an available tag that is not currently associated with another command that is awaiting execution. For example, in one embodiment, the available tag may be one of 32 possible NCQ tags that are used to index registers 222.

In block 320, device controller 204 of serial device 203 stores a data stream value in the one of registers 222 that is indexed by the identified available tag. The data stream value identifies the particular data stream over which the command was received from host device 202. For example, in one embodiment, the data stream value may identify one of 65534 possible data streams of the USB 3.0 standard.

In block 325, processor 206 of serial device 203 creates an address value for the command and passes the address to storage media controller 210.

In block 330, serial device 203 (e.g., by appropriate firmware, device controller 204, processor 206, and/or storage media controller 210) converts the command, if desired, into a format that may be executed by storage media device 212. For example, in one embodiment, serial device 203 may convert the command from a SCSI command into a SATA command that may be executed by storage media device 212. The command (e.g., the original command or the converted command) is provided from processor 206 to storage media controller 210.

In block 335, storage media controller 210 of serial device 203 sends the command (e.g., the converted SATA command in one embodiment) with the address value created in block 325 on to storage media device 212. For example, in one embodiment, the address value created in block 325 may be used as the address value for data transfer (e.g., SATA data transfer) for the command.

Blocks 310 through 335 may be repeated as desired for multiple commands. In this regard, multiple commands may be issued by host device 202, processed by serial device 203, and sent on to storage media device 212 for execution. Each command may have its own tag and address value which distinguish the command from other pending commands that have not yet been executed by storage media device 212.

In block 340, storage media device 212 begins execution of one of the commands provided in one of the iterations of blocks 310 through 335. In this regard, storage media device 212 may execute commands in a different order than sent by host device 202 (e.g., in accordance with NCQ techniques).

In block 345, storage media controller 210 of serial device 203 receives a setup notification from storage media device 212. For example, in one embodiment, the setup notification may be a DMA setup FIS sent by storage media device 212 upon execution of the command. In one embodiment, serial device 203 forwards the setup notification on to host device 202.

In block 350, storage media controller 210 of serial device 203 sends an acknowledgment back to storage media device 212 to acknowledge the setup notification and to indicate that serial device 203 is ready to participate in the data transfer for the command. In one embodiment, host device 202 provides the acknowledgment to serial device 203 which passes the acknowledgment to storage media device 212.

In block 355, device controller 204 of serial device 203 extracts the tag associated with the command from the address value associated with the command that was previously created by processor 206. For example, in one embodiment, storage media controller 210 may receive the address value from storage media device 212 with the setup notification received in block 345 and/or with other data transferred from storage media device 212 in response to execution of the command.

In one embodiment, storage media controller 210 passes the address value to device controller 204 over system bus 214 (e.g., without passing through processor 206). Device controller 204 extracts the tag associated with the currently executed command from the address value received over system bus 214. For example, the tag may be extracted from one or more address value bits of system bus 214 (e.g., higher address value bits) which may be used as an index to identify one of registers 222 as shown by arrow 226. In this regard, such address value bits may identify the tag associated with the currently executed command.

In block 360, device controller 204 of serial device 203 retrieves the data stream value associated with the currently executed command. In this regard, device controller 204 uses the tag extracted in block 355 as an index to registers 222. The particular one of registers 222 indexed by the extracted tag stores the data stream value associated with the currently executed command (e.g., previously stored during block 320). Accordingly, as discussed, the particular data stream associated with the currently executed command may be read from one of registers 222 using the command's associated tag as an index without requiring an interrupt to processor 206.

In block 365, device controller 204 of serial device 203 provides the retrieved data stream value to host device 202. As a result, host device 202 will know the data stream over which the data transfer will be performed for the command. In one embodiment, block 365 may include providing an endpoint ready (ERDY) notification from device controller 204 to host device 202 that includes the data stream value.

In block 370, a data transfer is performed over the data stream identified in blocks 360 and 365. In the case of a data read command, data may be passed from storage media device 212 to storage media controller 210 over bus 244, from storage media controller 210 to device controller 204 over system bus 214, and from device controller 204 to host device 202 over bus 234. In the case of a data write command, data may be passed from host device 202 to device controller 204 over bus 234, from device controller 204 to storage media controller 210 over system bus 214, and from storage media controller 210 to storage media device 212 over bus 244. Additional commands may be executed through appropriate additional iterations of blocks 340 through 370.

Where applicable, various embodiments provided by the disclosure may be implemented using hardware, software, firmware or combinations thereof. Also where applicable, the various hardware components, firmware components and/or software components set forth herein may be combined into composite components comprising software, firmware, hardware, and/or combinations thereof without departing from the spirit of the disclosure. Where applicable, the various hardware components, firmware components and/or software components set forth herein may be separated into sub-components comprising software, firmware, hardware, or combinations thereof without departing from the spirit of the disclosure. In addition, where applicable, it is contemplated that software components may be implemented as firmware or hardware components, and vice-versa.

Software in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method performed by a serial device, the method comprising:
   receiving a command from a host device over a data stream of a serial interface;
   storing a data stream value by a first device controller of the serial interface to identify the data stream in a register indexed by a tag associated with the command;
   passing the command to a storage media device, wherein the passing is controlled by a processor of the serial device being coupled with the first device controller;
   receiving an address value from the storage media device by a second device controller of the serial interface in response to execution of the command by the storage media device;
   extracting the tag by the second device controller from the address value received from the storage media device;
   passing the extracted tag by the second device controller to the first device controller through a system bus of the serial device connecting the first and second device controller;
   retrieving the data stream value from the register by the first device controller using the extracted tag as an index without requiring an interrupt to the processor to determine the data stream value; and
   passing data through said system bus between the serial device and the host device over the data stream identified by the data stream value.

2. The method of claim 1, wherein the tag is a native command queuing (NCQ) tag.

3. The method of claim 1, wherein the passing the command further comprises passing the address value to the storage media device with the command.

4. The method of claim 1, further comprising creating the address value using the tag.

5. The method of claim 4, wherein the address value comprises a plurality of bits identifying the tag.

6. The method of claim 1, wherein the address value is offset from another address value associated with another command, wherein the offset is a maximum data transfer size associated with the commands.

7. The method of claim 1, wherein the data stream is one of a plurality of data streams received over a universal serial bus (USB) protocol.

8. The method of claim 1, further comprising converting the command from a small computer system interface (SCSI) command to a serial advanced technology attachment (SATA) command by said processor at least before the execution of the command by the storage media device.

9. The method of claim 1, wherein the command is a read command adapted to cause the storage media device to read the data from the storage media device and pass the data to the serial device, or a write command adapted to cause the storage media device to receive the data from the serial device and write the data to the storage media device.

10. The method of claim 1, wherein the serial device is a storage media device enclosure, wherein the storage media device is implemented as part of the serial device.

11. The method of claim 1, wherein the storage media device is a hard drive.

12. The method of claim 1, further comprising repeating the method for a plurality of commands, a plurality of data streams, a plurality of data stream values, a plurality of registers, a plurality of tags, a plurality of address values, and a plurality of data.

13. A serial device comprising:
a first device controller comprising a serial interface adapted to receive a plurality of commands over a plurality of data streams, and a plurality of registers indexed by a plurality of tags and adapted to store a plurality of data stream values to identify the data streams;
a processor coupled with the first device controller and being adapted to control passing of the commands through the serial device;
a system bus coupled with the first device controller; and
a second device controller coupled with the processor and further being coupled with the first device controller via the system bus, the second device controller comprising a storage media device interface, wherein the second device controller is configured to output commands received from the processor through the storage media device interface, to receive an address value through the storage media device interface, and to pass the address value to the first device controller through the system bus;
wherein the first device controller is configured:
to store one of the data stream values in one of the registers in response to one of the commands, wherein the one of the data stream values identifies one of the data streams over which the one of the commands was received by the serial device, wherein the one of the registers is indexed by one of the tags, wherein the one of the tags is associated with the one of the commands,
to determine the one of the tags from an address value received from the second device controller,
and to retrieve the data stream value from the register using the extracted tag as an index without requiring an interrupt to the processor to determine the data stream value, and
wherein data is passed between the first and second device controllers via the system bus and through the serial interface over the data stream identified by the data stream value.

14. The device of claim 13, wherein the one of the tags is a native command queuing (NCQ) tag.

15. The device of claim 13, wherein the device is adapted to pass the address value through the storage media device interface with the one of the commands.

16. The device of claim 13, wherein the device is adapted to create the address value using the one of the tags.

17. The device of claim 16, wherein the address value comprises a plurality of bits identifying the tag.

18. The device of claim 17, wherein the address value is offset from another address value associated with another one of the commands, wherein the offset is a maximum data transfer size associated with the commands.

19. The device of claim 13, wherein the data streams are received over a universal serial bus (USB) protocol.

20. The device of claim 13, wherein the processor is configured to convert the one of the commands from a small computer system interface (SCSI) command to a serial advanced technology attachment (SATA) command at least before the execution of the one of the commands by the storage media device.

21. The device of claim 13, wherein the one of the commands is a read command adapted to cause a storage media device coupled with said storage media device interface to read the data from the storage media device and pass the data to the serial device, or a write command adapted to cause the storage media device to receive the data from the serial device and write the data to the storage media device.

22. The device of claim 13, wherein the serial device is a storage media device enclosure, wherein the storage media device is implemented as part of the serial device.

23. The device of claim 13, wherein the storage media device is a hard drive.

24. The device of claim 13, wherein the device controller is adapted to perform the store, extract, retrieve, and pass operations for the plurality of commands, the plurality of data streams, the plurality of data stream values, the plurality of registers, the plurality of tags, a plurality of address values, and a plurality of data.

* * * * *